(12) United States Patent
Jung (10) Patent No.: US 11,338,968 B2
(45) Date of Patent: May 24, 2022

(54) FIXED QUANTITY DISCHARGE DEVICE FOR LIQUID CONTAINER

(71) Applicant: YONWOO CO., LTD., Incheon (KR)

(72) Inventor: Seo Hui Jung, Incheon (KR)

(73) Assignee: YONWOO CO., LTD., Incheon (KR)

( * ) Notice: Subject to any disclaimer, the term of this patent is extended or adjusted under 35 U.S.C. 154(b) by 0 days.

(21) Appl. No.: 17/044,634

(22) PCT Filed: Apr. 3, 2019

(86) PCT No.: PCT/KR2019/003940
§ 371 (c)(1),
(2) Date: Oct. 1, 2020

(87) PCT Pub. No.: WO2019/198967
PCT Pub. Date: Oct. 17, 2019

(65) Prior Publication Data
US 2021/0147124 A1    May 20, 2021

(30) Foreign Application Priority Data

Apr. 11, 2018    (KR) .......................... 10-2018-0042322

(51) Int. Cl.
*B65D 47/18*    (2006.01)
*B65D 47/24*    (2006.01)
(Continued)

(52) U.S. Cl.
CPC ............. *B65D 47/18* (2013.01); *A45D 34/00* (2013.01); *B65D 1/08* (2013.01); *B65D 47/2031* (2013.01);
(Continued)

(58) Field of Classification Search
CPC ................ B65D 47/18; B65D 47/241; B65D 2547/063; B65D 47/2031; B65D 1/08;
(Continued)

(56) References Cited

U.S. PATENT DOCUMENTS

| 10,345,133 | B2 * | 7/2019 | Ham | ...................... B05B 11/02 |
| 2014/0234007 | A1 * | 8/2014 | Lee | ......................... A45D 34/00 |
| | | | | 401/121 |

(Continued)

FOREIGN PATENT DOCUMENTS

| KR | 10-1311209 B1 | 9/2013 |
| KR | 10-1328457 B1 | 11/2013 |

(Continued)

*Primary Examiner* — Frederick C Nicolas
(74) *Attorney, Agent, or Firm* — Novick, Kim & Lee, PLLC; Sang Ho Lee; Hyun Woo Shin (57) ABSTRACT

A fixed quantity discharge device for a liquid container is provided. The device includes a container main body in which contents are accommodated, a pipette part including a pipette tube to suction and discharge the contents accommodated in the container main body, and a support disposed in an upper portion of the container main body and including a coupling part formed in an upper end portion thereof to be coupled to the pipette part, a tube accommodation part extending from the coupling part to an interior of the container main body such that the pipette tube is inserted into or withdrawn from the tube accommodation part, and a contents inflow hole formed in a lower end portion thereof to communicate with the interior of the container main body, wherein, when the pipette part is separated from the support, the contents accommodated in the container main body may be suctioned into the pipette tube.

9 Claims, 12 Drawing Sheets

(51) Int. Cl.
  *G01F 11/02* (2006.01)
  *B65D 47/20* (2006.01)
  *B65D 1/08* (2006.01)
  *A45D 34/00* (2006.01)
  *B05B 11/00* (2006.01)

(52) U.S. Cl.
  CPC .......... *B65D 47/241* (2013.01); *G01F 11/025* (2013.01); *A45D 2200/056* (2013.01); *B05B 11/00416* (2018.08); *B05B 11/3047* (2013.01); *B05B 11/3052* (2013.01); *B05B 11/3069* (2013.01); *B05B 11/3074* (2013.01); *B65D 2251/0025* (2013.01); *B65D 2547/063* (2013.01)

(58) Field of Classification Search
  CPC .......... B65D 2251/0025; G01F 11/025; B05B 11/3052; B05B 11/00416; B05B 11/3074; B05B 11/3069; B05B 11/3047; A45D 34/00; A45D 2200/056
  See application file for complete search history.

(56) References Cited

U.S. PATENT DOCUMENTS

| | | | |
|---|---|---|---|
| 2015/0320175 A1* | 11/2015 | Lee | B65D 51/32 222/372 |
| 2016/0058154 A1* | 3/2016 | Jung | G01F 11/028 222/382 |
| 2016/0324294 A1* | 11/2016 | Kim | B05B 15/656 |
| 2017/0000236 A1* | 1/2017 | Jung | B05B 15/20 |
| 2017/0082475 A1* | 3/2017 | Ham | B05B 11/02 |

FOREIGN PATENT DOCUMENTS

| | | |
|---|---|---|
| KR | 10-1406893 B1 | 6/2014 |
| KR | 10-2015-0034710 A | 4/2015 |
| KR | 10-1587785 B1 | 1/2016 |

* cited by examiner

FIXED QUANTITY DISCHARGE DEVICE FOR LIQUID CONTAINER

TECHNICAL FIELD

The present invention relates to a fixed quantity discharge device for a liquid container, and more specifically, to a fixed quantity discharge device for a liquid container allowing a predetermined quantity of contents to be withdrawn and used through only an operation of separating a cap.

BACKGROUND ART

Generally, as a preferable method of using liquid contents such as cosmetics that are used in a small and exactly fixed quantity, like eye cream, a method of individually packaging contents in the form of a capsule and the like containing a quantity thereof which may be completely used at one time is conventionally used. However, when such an individual packaging method is used, since a relatively large quantity of the contents remains even after a user uses the contents, there is a problem in that it is very inefficient.

In order to overcome the problem of the individual packaging, a method, after contents are accommodated in a container, of using a withdrawal tool having a general pipette or syringe structure or a withdrawal tool having a push pump structure to withdraw and use the contents whenever the contents are used, has been devised.

However, in the case of the withdrawal tool having the general pipette structure, since a suctioned and withdrawn quantity is changed according to the extent to which a user pushes a rubber compressible part, there is a problem in that it is not easy to exactly withdraw and use a predetermined quantity thereof.

In addition, in the case in which the withdrawal tool having the syringe structure is used, when it is considered that a very small quantity of about 1 ml is mainly used, there is a structural problem in that a diameter of a syringe should be extremely small or a stroke of a syringe piston should be small, and since the syringe piston should be pulled to suction the contents and pushed to withdraw the contents, there is a problem in that it is cumbersome to use.

Accordingly, a technology for solving such problems is required.

Technical Problem

The present invention is directed to providing a fixed quantity discharge device for a liquid container allowing contents accommodated in a container main body to be suctioned into a pipette tube by separating a cap therefrom so as to withdraw and use a predetermined quantity of contents without additional manipulation.

Objectives to be solved through the present invention are not limited to the above-described objective, and other objectives which are not mentioned above will be clearly understood by those skilled in the art through the following specification.

Technical Solution

One aspect of the present invention provides a fixed quantity discharge device for a liquid container. The device includes a container main body in which contents are accommodated, a pipette part including a pipette tube to suction and discharge the contents accommodated in the container main body, and a support disposed in an upper portion of the container main body and including a coupling part formed in an upper end portion thereof to be coupled to the pipette part, a tube accommodation part extending from the coupling part to an interior of the container main body such that the pipette tube is inserted into or withdrawn from the tube accommodation part, and a contents inflow hole formed in a lower end portion thereof to communicate with the interior of the container main body, wherein, when the pipette part is separated from the support, the contents accommodated in the container main body are suctioned into the pipette tube.

The pipette part may include the pipette tube, a stem inserted into the pipette tube and moved upward or downward, a plunger tip coupled to a lower end portion of the stem and vertically moved in the pipette tube according to upward or downward movement of the stem, and a screw cap screw-coupled to the coupling part and including a guide part formed inside an upper end portion thereof to guide upward movement of the stem to suction the contents accommodated in the container main body when the pipette part is separated therefrom.

The fixed quantity discharge device may further include an outer cap coupled to surround the screw cap, rotated according to manipulation of a user for separating or coupling the pipette part from or to the outer cap, and including a vertical guide groove formed in an inner surface thereof to guide vertical movement of a button part, and the button part coupled to an upper end portion of the stem and including at least one coupling protrusion formed on an outer surface thereof to be coupled to the vertical guide groove, wherein the button part and the stem may be rotated with the outer cap in the same direction according to the rotation of the outer cap.

The guide part may include an ascending guide surface formed to have an upper inclined surface in a first direction, at least one lifting protrusion is formed on an outer circumferential surface of the stem, and when the stem is rotated in the first direction due to the rotation of the outer cap, the lifting protrusion may be moved along the ascending guide surface, and the stem may be moved upward so that the contents accommodated in the container main body are suctioned into the pipette tube.

The fixed quantity discharge device may further include an auxiliary cap coupled to the screw cap to surround the guide part, wherein a locking jaw which restricts movement of the lifting protrusion in the first direction may be formed on an upper inner side of the auxiliary cap.

When the lifting protrusion is moved to come into contact with the locking jaw according to the rotation of the stem in the first direction, the screw cap may be rotated with the outer cap in the first direction so that the screw cap is separated from the coupling part of the support.

The locking jaw may be formed to be spaced apart from the guide part, and when the lifting protrusion is positioned in a separation space between the guide part and the locking jaw and the user presses the button part, the stem and the plunger tip may be moved downward so that the contents suctioned into the pipette tube are discharged to the outside.

The guide part may further include a vertical surface formed to face the ascending guide surface, and when the outer cap is rotated in a second direction opposite to the first direction through manipulation of the user and the lifting protrusion comes into contact with the vertical surface, the screw cap may be rotated with the outer cap in the second direction so that the screw cap is coupled to the coupling part.

At least one open part may be formed by cutting at least a part of a circumference of an upper portion of the screw cap downward, and when the coupling protrusion is aligned with the open part, the button part may be moved downward due to a user's pressure.

In addition, a protrusion part may protrude downward from an upper inner side of the button with a predetermined length, a coupling groove, which has a shape corresponding to the protrusion part such that the protrusion part is inserted into the coupling groove, may be formed in the upper end portion of the stem, and an insertion depth of the protrusion part inserted into the coupling groove may be changed in response to upward or downward movement of the stem.

Advantageous Effects

According to embodiments, since contents accommodated in a container main body are suctioned into a pipette tube in response to an operation of rotation for separating the pipette part, a predetermined quantity of the contents can be withdrawn and used without additional manipulation.

In addition, since the pipette tube is not directly exposed to the contents stored in the container main body, contamination of the pipette tube due to the contents can be prevented, and since a piston, which is moved upward as the contents in the container main body are used, is provided, the contents remaining in the container main body can be minimized.

In addition, when a button part is pressed in a state in which the pipette part is not completely separated, a check valve configured to open and close a contents inflow hole can prevent contents from being moved to the container main body, and air can be prevented from being introduced into the container main body when the pipette part is separated.

DESCRIPTION OF DRAWINGS

In order to sufficiently understand drawings referenced in a detailed description of the present invention, brief descriptions of the drawings are provided.

MODES OF THE INVENTION

Hereinafter, embodiments of the present invention will be described with reference to the accompanying drawings. When reference numerals are assigned to components of each drawing, it should be noted that, even when the same components are illustrated in different drawings, the same numerals are assigned to the same components whenever possible. In addition, in the descriptions of the embodiments of the present invention, when specific descriptions of related well-known technologies or functions are deemed to unnecessarily obscure the understanding about the embodiments of the present invention, they will be omitted. In addition, although the embodiments of the present invention will be described below, the technical spirit of the present invention will not be limited thereto and may be variously modified and implemented by those skilled in the art. Meanwhile, for the sake of convenience, upward, downward, left, and right directions, which will be mentioned below, are based on the drawings, and the scope of the present invention is not necessarily limited thereto.

Throughout this specification, when a part is referred to as being "connected" to another part, it includes "directly connected" and "indirectly connected" via an intervening part. Also, when a certain part "includes" a certain component, this does not exclude other components unless explicitly described otherwise, and other components may in fact be included. In addition, in descriptions of components of the embodiments of the present invention, terms such as "first," "second," "A," "B," "(a)" and "(b)" can be used. The terms are only to distinguish one element from another element, and the essence, order, number, and the like of the elements are not limited to the terms.

Figure 1:
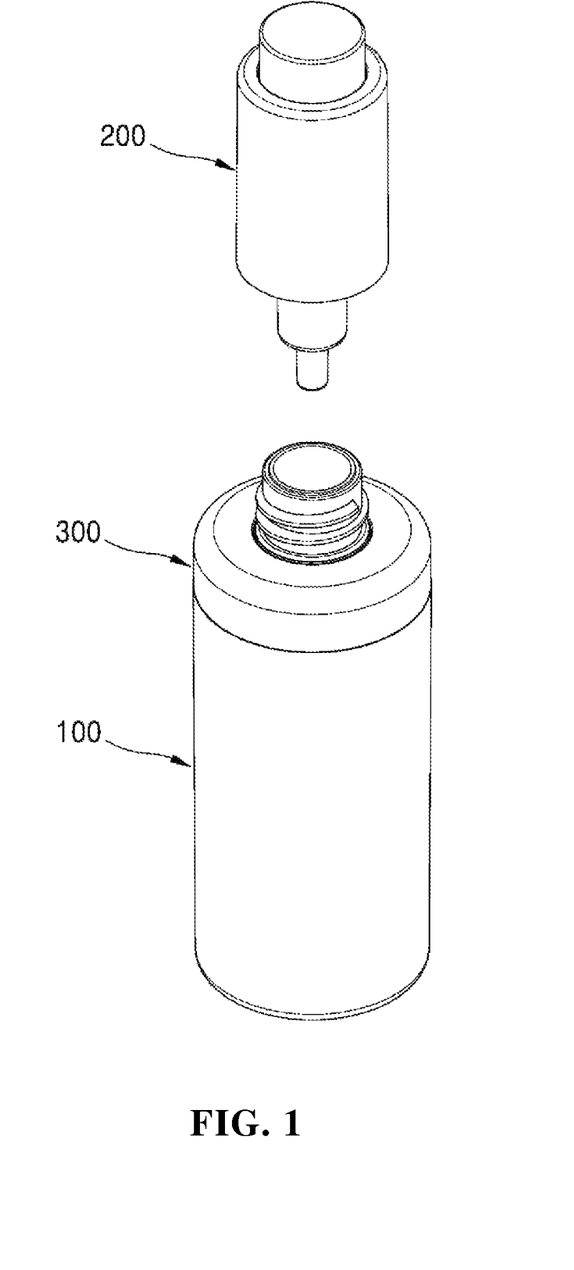
FIG. 1 is a perspective view illustrating a fixed quantity discharge device for a liquid container according to one embodiment of the present invention.
Figure 2:
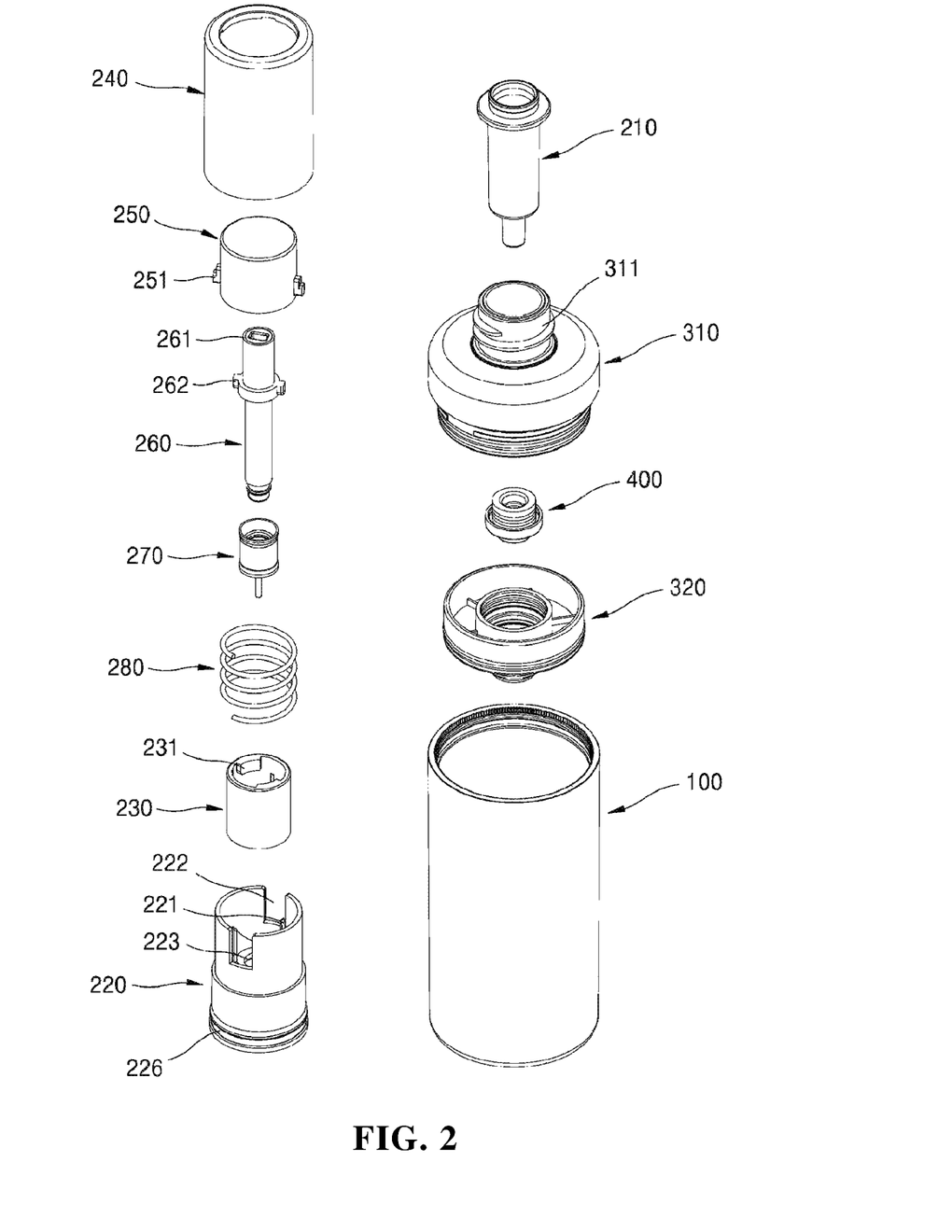
FIG. 2 is an exploded perspective view illustrating the fixed quantity discharge device for a liquid container according to one embodiment of the present invention.
Figure 3:
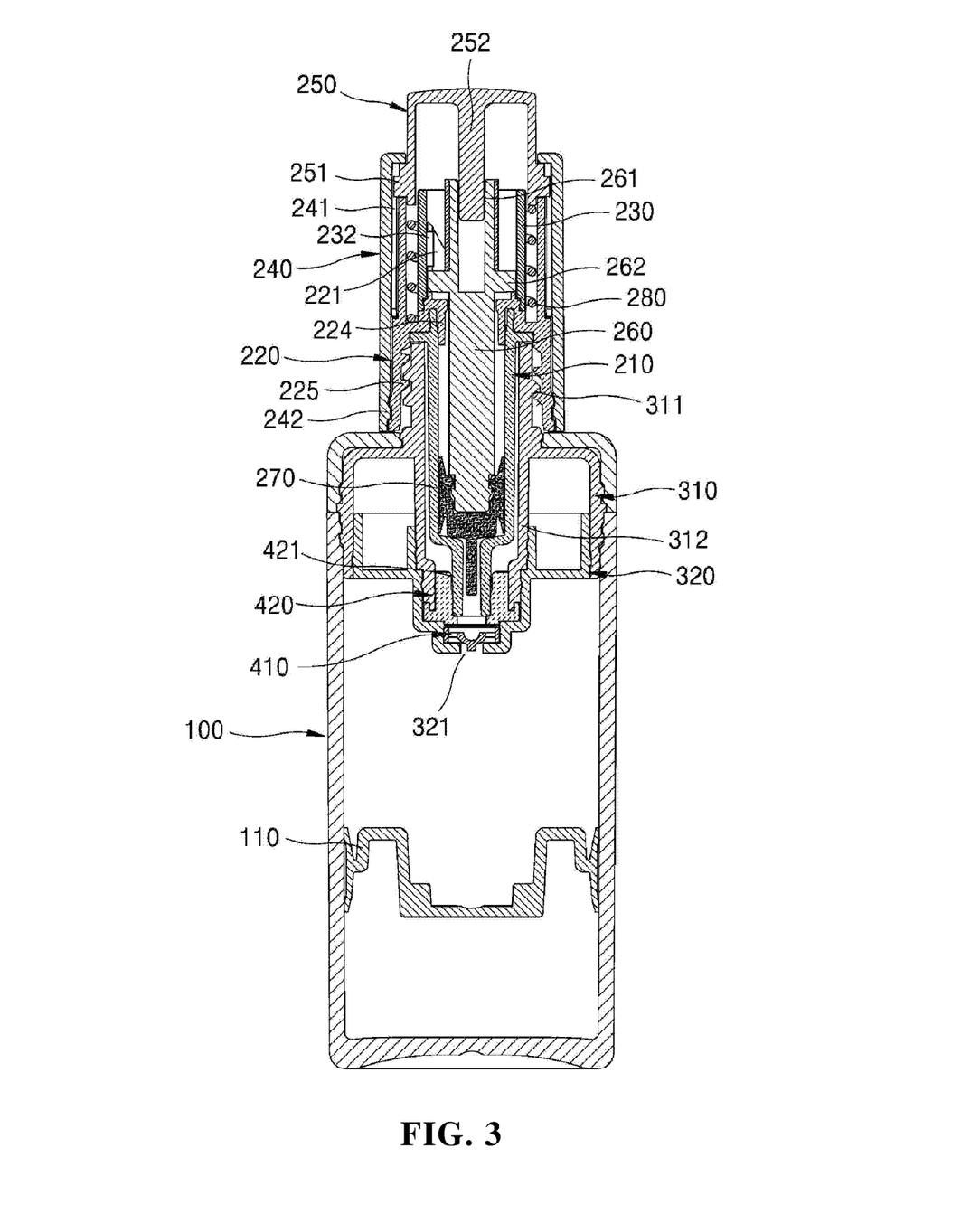
FIG. 3 is a cross-sectional view illustrating a coupled state of the fixed quantity discharge device for a liquid container according to one embodiment of the present invention.
Figure 4:
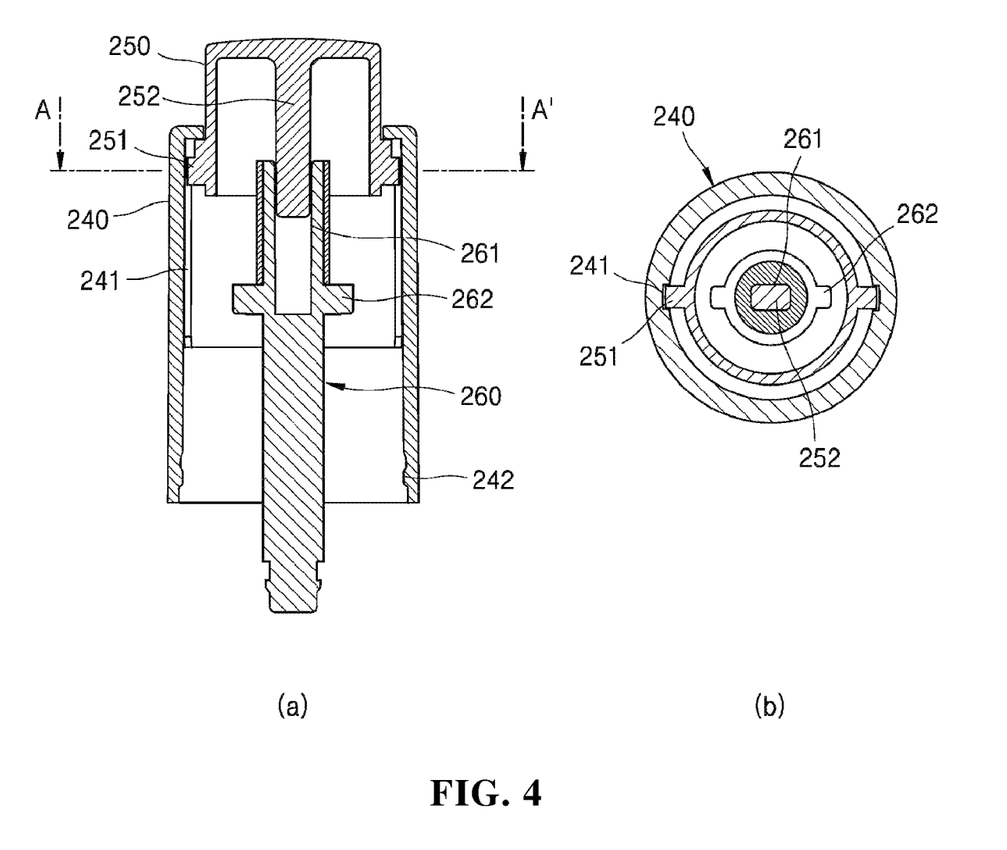
FIG. 4 is a set of views illustrating a coupling relationship between a screw cap and an auxiliary cap of the fixed quantity discharge device for a liquid container according to one embodiment of the present invention.
Figure 5:
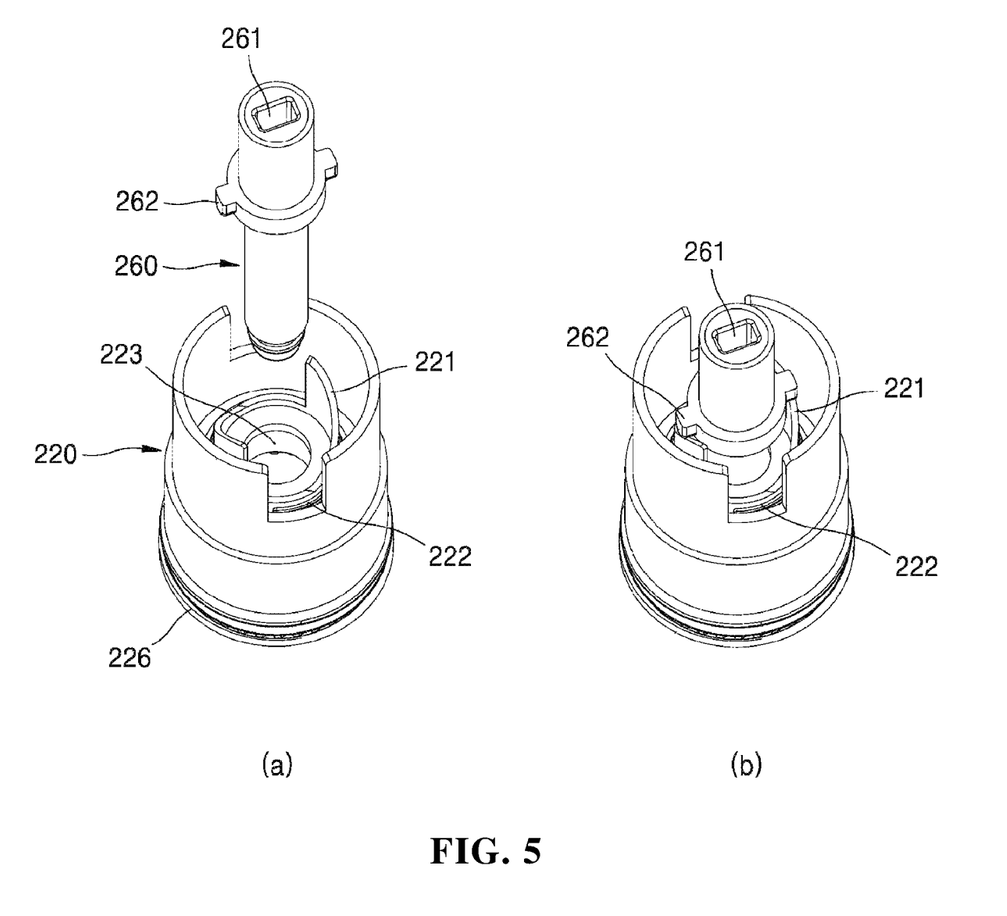
FIG. 5 is a set of views illustrating a coupling relationship between a button part, an outer cap, and a stem of the fixed quantity discharge device for a liquid container according to one embodiment of the present invention.
Figure 6:
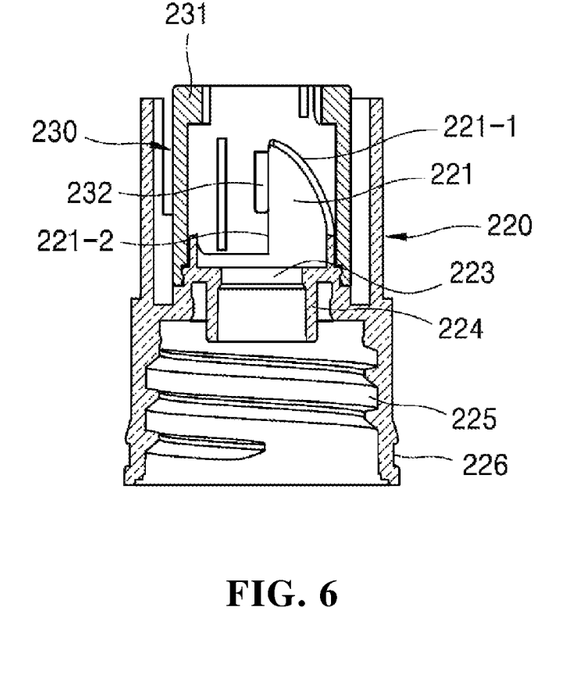
FIG. 6 is a view illustrating a coupling relationship between the screw cap and the stem of the fixed quantity discharge device for a liquid container according to one embodiment of the present invention.

FIGS. 1 to 3 are perspective, exploded perspective, and cross-sectional views illustrating a fixed quantity discharge device for a liquid container according to one embodiment of the present invention. FIG. 4 is a view illustrating a coupling relationship between a screw cap and an auxiliary cap of the fixed quantity discharge device for a liquid container according to one embodiment of the present invention, FIG. 5 is a view illustrating a coupling relationship between a button part, an outer cap, and a stem, and FIG. 6 is a view illustrating a coupling relationship between a screw cap and the stem.

Referring to FIGS. 1 to 6, the fixed quantity discharge device for a liquid container according to one embodiment of the present invention may include a container main body 100, a pipette part 200, a support 300, and a contents suction part 400.

The container main body 100 may accommodate contents therein. In this case, the contents may be liquid or gel cosmetics, medicines, or quasi-drugs such as toothpaste but are not limited thereto, and may include any kind of contents capable of being suctioned and discharged through a pipette tube 210. Meanwhile, a piston 110, which is moved upward as the contents are used, may be provided in the container main body 100. When the contents are withdrawn from the container main body 100 using the pipette part 200 and used, the contents remaining on an inner wall of the container main body 100 may be minimized due to the piston.

The pipette part 200 is detachably coupled to the support 300 disposed in an upper portion of the container main body 100, is a part for suctioning a fixed quantity of the contents from the container main body 100 and discharging the fixed quantity of the contents, and may include a pipette tube 210, a screw cap 220, an auxiliary cap 230, an outer cap 240, a button part 250, a stem 260, a plunger tip 270, and an elastic part 280.

A lower end portion of the pipette tube 210 is open, and thus the contents accommodated in the container main body 100 may be suctioned and discharged therethrough. Specifically, the pipette tube 210 may be inserted into a tube accommodation part 312 when the support 300 and the pipette part 200 are coupled and may suction the contents which are introduced into the support 300 from the container main body 100 through the contents inflow hole 321 according to an operation of rotation for separating the pipette part 200 from the support 300. In addition, when the pipette part 200 is separated from the support 300, the pipette tube 210 may be formed to be withdrawn from the tube accommodation part 312 to discharge the contents to the outside according to pressure on the button part 250.

The screw cap 220 may be detachably screw-coupled to a coupling part 311 of the support 300. For example, when the screw cap 220 is rotated in a first direction, the screw-coupling may be released so that the screw cap 220 may be separated from the coupling part 311, and when the screw cap 220 is rotated in a second direction opposite to the first direction, the screw cap 220 may be coupled to the coupling part 311.

At least one guide part 221 configured to guide the upward movement of the stem 260 when the pipette part 200 is separated from the support 300 may be formed inside an upper end portion of the screw cap 220. As the stem 260 is moved upward by the guide part 221, the contents accommodated in the container main body 100 are suctioned into the pipette tube 210.

The guide part 221 may include an ascending guide surface 221-1 formed at one side thereof and a vertical surface 221-2 formed at the other side in a direction facing the ascending guide surface 221-1. The ascending guide surface 221-1 is formed to have an upper inclined surface in the first direction, and when the stem 260 is rotated in the first direction, a lifting protrusion 262 moves upward along the ascending guide surface 221-1 to move the stem 260 and the plunger tip 270 upward in the pipette tube 210. Meanwhile, the vertical surface 221-2 may be brought into close contact with a support jaw 232 of the auxiliary cap 230, and when the pipette part 200 is coupled to the support 300, the vertical surface 221-2 may come into contact with the lifting protrusion 262 of the stem 260 to receive a rotational force so as to rotate the screw cap 220 in the second direction.

One or more portions of a circumference of an upper portion of the screw cap 220 may be cut downward by a predetermined length to form one or more open parts 222. The number of the open parts 222 may correspond to that of coupling protrusions 251 of the button part 250.

A tube fixing part 224 which fixes the pipette tube 210 to the screw cap 220 may be formed at a lower center of the screw cap 220. The tube fixing part 224 surrounds and is coupled to an upper portion of the pipette tube 210 to prevent the pipette tube 210 from being separated from screw cap 220 in a state in which the pipette part 200 is separated from the coupling part 311 of the support 300. In addition, a through hole 223 may be formed in a central portion of the tube fixing part 224 to allow the stem 260 to pass through the through hole 223.

In addition, a screw-coupling part 225 to be screw-coupled to the coupling part 311 may be formed on a lower inner circumferential surface of the screw cap 220, and a coupling groove 226 to which an annular protrusion 242 of the outer cap 240 is rotatably coupled may be formed to be recessed in an outer circumferential surface of the screw cap 220.

The auxiliary cap 230 may be coupled to an inner upper side of the screw cap 220 to surround the guide part 221. A locking jaw 231 which restricts movement of the lifting protrusion 262 of the stem 260 in the first direction may be formed on an upper inner side of the auxiliary cap 230, and the support jaw 232 disposed to be brought into close contact with the vertical surface 221-2 of the guide part 221 may be formed on one region of an inner surface of the auxiliary cap 230. As will be described below, when the pipette part 200 is rotated in the second direction to be coupled, the lifting protrusion 262 is disposed between the vertical surface 221-2 and the support jaw 232 to transfer a rotational force to the screw cap 220.

The outer cap 240 may be coupled to surround the screw cap 220 to be rotated according to the manipulation of a user. As the button part 250, the stem 260, and/or the screw cap 220 are rotated with the outer cap 240, the pipette part 200 is separated from or coupled to the support 300. Meanwhile, a vertical guide groove 241 for guiding the vertical movement of the button part 250 may be formed in an inner surface of the outer cap 240, and the annular protrusion 242 coupled to the coupling groove 226 of the screw cap 220 may be formed on an outer circumferential surface of a lower end portion of the outer cap 240.

The button part 250 is coupled to an upper end portion of the stem 260, and at least one coupling protrusion 251, which will be coupled to the vertical guide groove 241 of the outer cap 240, may be formed on an outer surface of the button part 250. Accordingly, the button part 250 and the stem 260 coupled to the button part 250 are rotated in the same direction according to rotation of the outer cap 240.

A protrusion part 252 may protrude downward from an upper inner side of the button part 250 with a predetermined length. The button part 250 and the stem 260 are formed to be coupled when the protrusion part 252 is inserted into a coupling groove 261 formed in an upper end portion of the stem 260. In this case, the protrusion part 252 may be formed to have a horizontal cross section having, for example, a polygonal shape or a rectangular shape of which a length and a width are different but is not limited thereto, and have any one of various shapes suitable for transferring a rotational force of the button part 250 to the stem 260.

The button part 250 may be formed to be pressed by the user in a state in which the pipette part 200 is separated from the support 300 to move the stem 260 and the plunger tip 270 downward so as to discharge the contents suctioned into the pipette tube 210 to the outside.

The stem 260 may be inserted into the pipette tube 210 and moved upward or downward by the guide part 221 and/or the button part 250.

The coupling groove 261 into which the protrusion part 252 of the button part 250 is inserted may be formed in the upper end portion of the stem 260. The coupling groove 261 is formed to correspond to a shape and a length of the protrusion part 252 to receive the rotational force of the button part 250. An insertion depth of the protrusion part 252 inserted into the coupling groove 261 may be changed according to upward or downward movement of the stem 260.

At least one lifting protrusion 262 may be formed to protrude outward from an outer circumferential surface of the stem 260. When the button part 250 and the stem 260 are rotated with the outer cap 240 in the first direction, the lifting protrusion 262 is moved upward along the ascending guide surface 221-1 in the first direction in a state in which the lifting protrusion 262 is seated on the ascending guide surface 221-1 of the guide part 221 to move the stem 260 and the plunger tip 270 upward, and accordingly, the contents accommodated in the container main body 100 may be suctioned into the pipette tube 210.

The plunger tip 270 may be coupled to a lower end portion of the stem 260 and vertically moved in the pipette tube 210 according to upward or downward movement of the stem 260. The plunger tip 270 may be formed to be brought into close contact with an inner surface of the pipette tube 210, and when the plunger tip 270 is vertically moved, the plunger tip 270 may change a pressure in the pipette tube 210 so that the pipette tube 210 may suction the contents from the container main body 100 or discharge the contents to the outside.

The elastic part 280 may be provided between the screw cap 220 and the button part 250 to surround the auxiliary cap 230 so as to apply an elastic force to the button part 250 in an upward direction. When the user presses the button part 250 to discharge the contents in a state in which the pipette part 200 is separated from the support 300, the elastic part 280 is pushed out so that the stem 260 and the plunger tip 270 are moved downward with the button part 250. Next, when the user releases the pressure applied to the button part 250, the button part 250 is returned to an original position due to the elastic force of the elastic part 280. The elastic part 280 may be formed, for example, as a spring but is not limited thereto, and may be formed of any one of various elastic materials according to an embodiment applied to the present invention.

The support 300 may be disposed in an upper portion of the container main body and include an upper support 310 and a lower support 320. The coupling part 311 screw-coupled to the screw cap 220 is formed on an upper end portion of the upper support 310, and the tube accommodation part 312 through which the pipette tube 210 is inserted into the container main body 100 or the pipette tube 210 is withdrawn from the container main body 100 may be formed to extend from the coupling part 311. The contents inflow hole 321 communicating with an inner portion of the container main body 100 may be formed at a center of a lower end portion of the lower support 320. As the upper support 310 and the lower support 320 are coupled, the contents suction part 400, which will be described below, is accommodated in the support 300, and the pipette tube 210 is not directly exposed to the contents in the container main body 100.

The contents suction part 400 may be a part for introducing the contents into the support 300 and transferring the contents to the pipette tube 210 and may include a check valve 410 and a sealing member 420.

The check valve 410 may be disposed above the contents inflow hole 321 of the lower support 320 to open or close the contents inflow hole 321 in response to upward or downward movement of the stem 260 and the plunger tip 270. For example, when the stem 260 and the plunger tip 270 are moved upward so that a pressure in the pipette tube 210 is changed, the check valve 410 opens the contents inflow hole 321, and thus the contents are introduced into the support 300 through the contents inflow hole 321.

In a case in which the user presses the button part 250 due to carelessness in a state in which the pipette part 200 is not completely separated from the coupling part 311, the check valve 410 may prevent the contents suctioned into the pipette tube 210 from being moved to the container main body 100. In addition, when the pipette part 200 is completely separated from the coupling part 311, the check valve 410 may prevent air from being introduced into the container main body 100 so that degradation of the contents may be prevented.

The sealing member 420 may be installed on the check valve 410 in a state in which the sealing member 420 is brought into close contact with an inner surface of the lower support 320. Particularly, in the present invention, when the upper support 310 and the lower support 320 are coupled, a lower end of the tube accommodation part 312 may press the sealing member 420 so that the sealing member 420 is brought into close contact with the inner surface of the lower support 320. Since the sealing member 420 is formed to surround and be coupled to the lower end portion of the pipette tube 210 when the pipette part 200 is coupled to the coupling part 311, the contents are prevented from being moved to places except for the pipette tube 210. An inlet hole 421 may be formed to pass through a center of the sealing member 420 so as to allow the lower end portion of the pipette tube 210 to be inserted or withdrawn therethrough.

Figure 7:
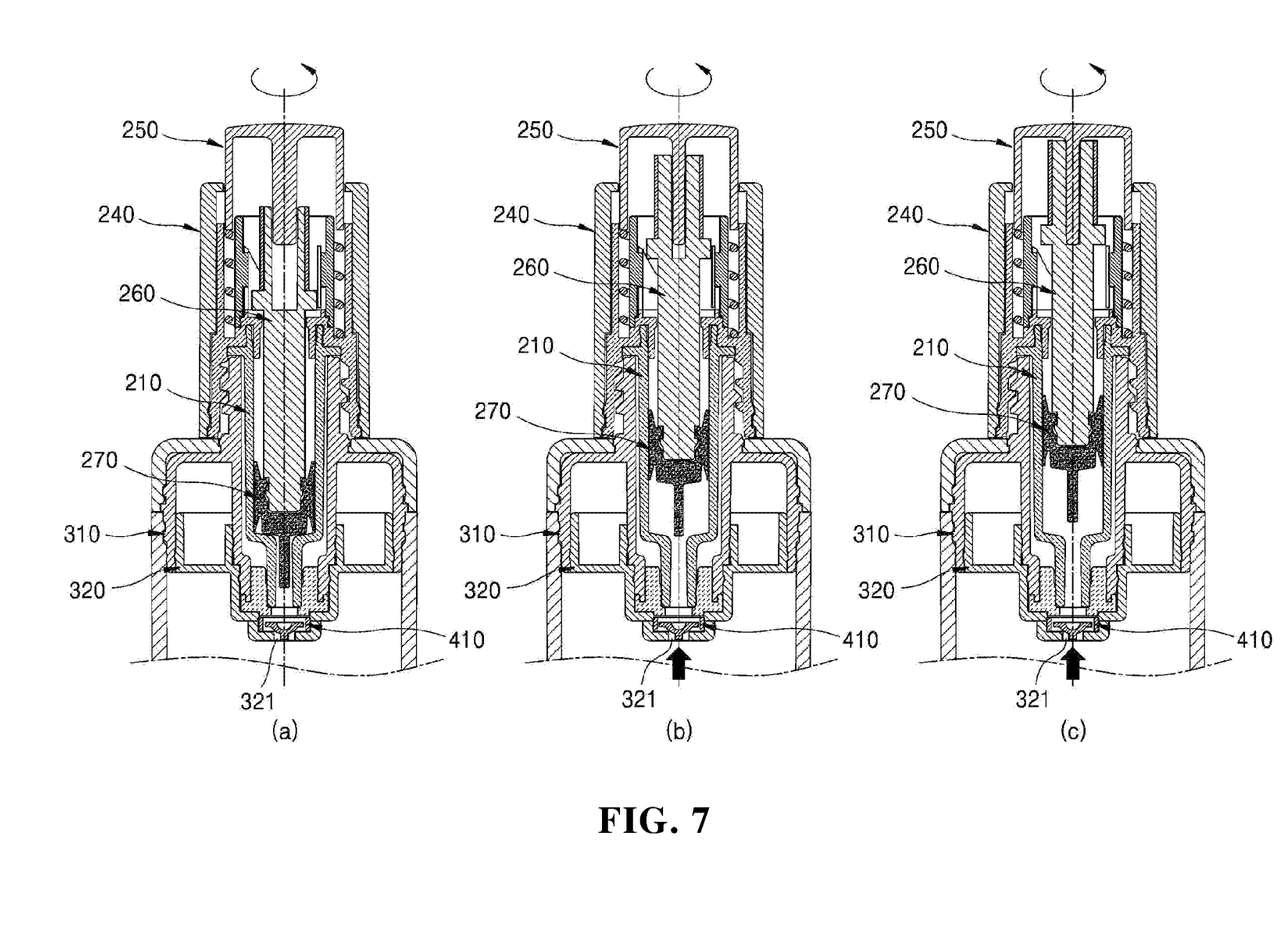
FIGS. 7 to 9 are views illustrating an exemplary operation of the fixed quantity discharge device for a liquid container according to one embodiment of the present invention.
Figure 8:
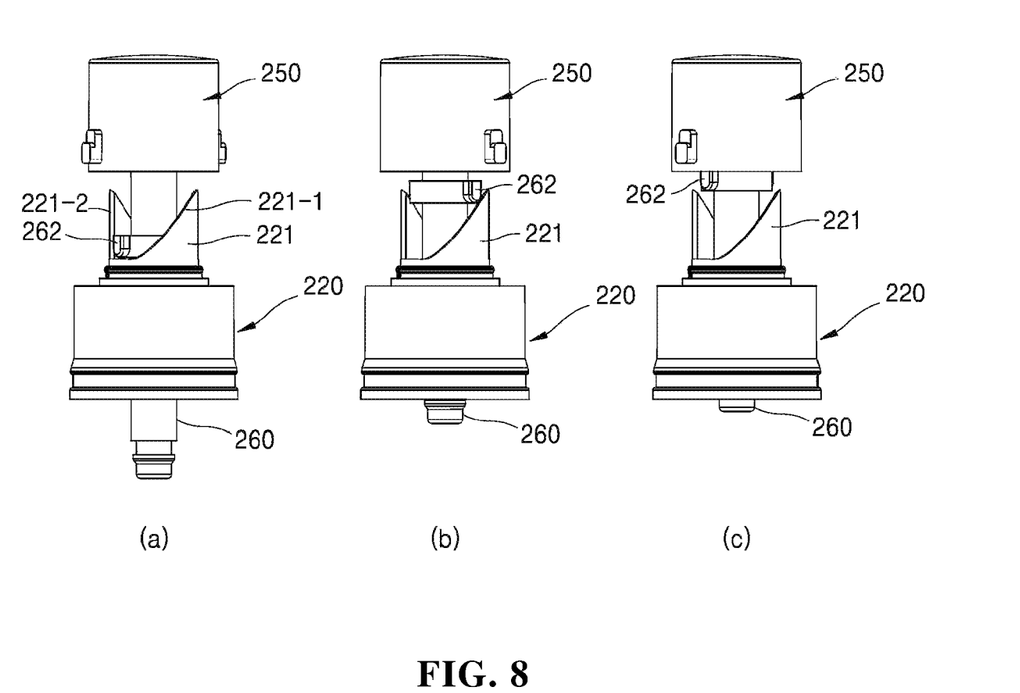
Figure 9:
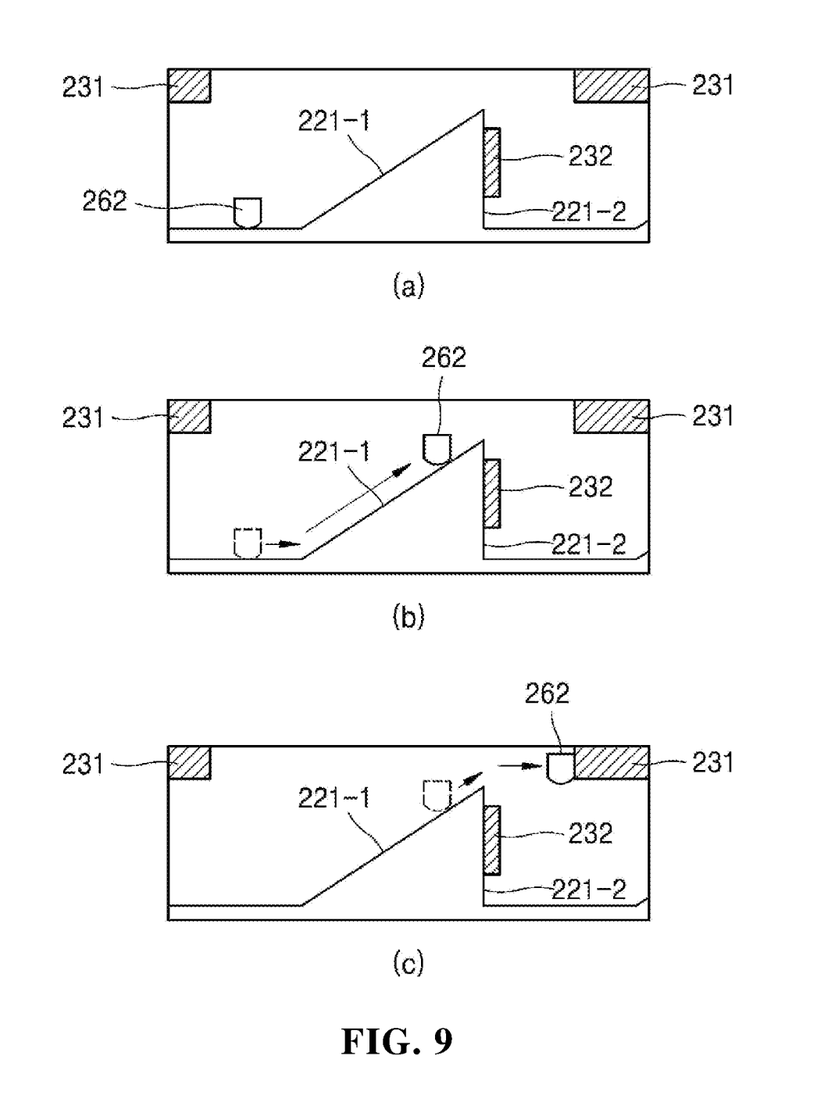

FIGS. 7 to 9 are views illustrating an exemplary operation of the fixed quantity discharge device for a liquid container according to one embodiment of the present invention. More specifically, FIGS. 7 to 9 are views illustrating an exemplary operation in which the contents are suctioned into the pipette tube in response to a separation operation of the pipette.

Referring to FIGS. 7(a), 8(a) and 9(a), in a state in which the pipette part 200 is coupled to the coupling part 311 of the support 300, the stem 260 maintains a lowered state such that the plunger tip 270 is brought into close contact with an inner lower end of the pipette tube 210. In this case, the lifting protrusion 262 of the stem 260 is lowered to an inner lower end surface of the screw cap 220, and since the coupling protrusion 251 is supported by a circumference of the upper end portion of the screw cap 220 or the elastic force of the elastic part 280, the button part 250 maintains a protruding state.

Next, referring to FIGS. 7(b), 8(b), and 9(b), in a case in which the user rotates the outer cap 240 in the first direction for separation of the pipette part 200, the button part 250 and the stem 260 are rotated with the outer cap 240 in the first direction. In this case, the screw cap 220 maintains a stationary state, the lifting protrusion 262 is moved upward along the ascending guide surface 221-1 of the guide part 221 in the first direction according to the rotation of the stem 260 so that the stem 260 and the plunger tip 270 are moved upward in the pipette tube 210. Accordingly, a pressure in the pipette tube 210 is changed, and the contents accommodated in the container main body 100 are suctioned into the pipette tube 210. Meanwhile, in this case, since an original position of the button part 250 is maintained, the protrusion part 252 of the button part 250 is gradually and deeply inserted into the coupling groove 261 due to the upward movement of the stem 260.

Next, referring to FIGS. 7(c), 8(c), and 9(c), after the lifting protrusion 262 is moved upward to an end of the ascending guide surface 221-1, the lifting protrusion 262 may be horizontally moved in the first direction to come into contact with the locking jaw 231 of the auxiliary cap 230 disposed to be spaced apart from the guide part 221. Accordingly, a rotational force of the stem 260 is transferred to the screw cap 220, the screw cap 220 is rotated with the outer cap 240, the button part 250, and the stem 260 in the first direction, and thus screw-coupling between the coupling part 311 and the screw cap 220 is released. Accordingly, the pipette part 200 may be separated from the support 300 in a state in which the pipette part 200 has suctioned the contents.

Figure 10:
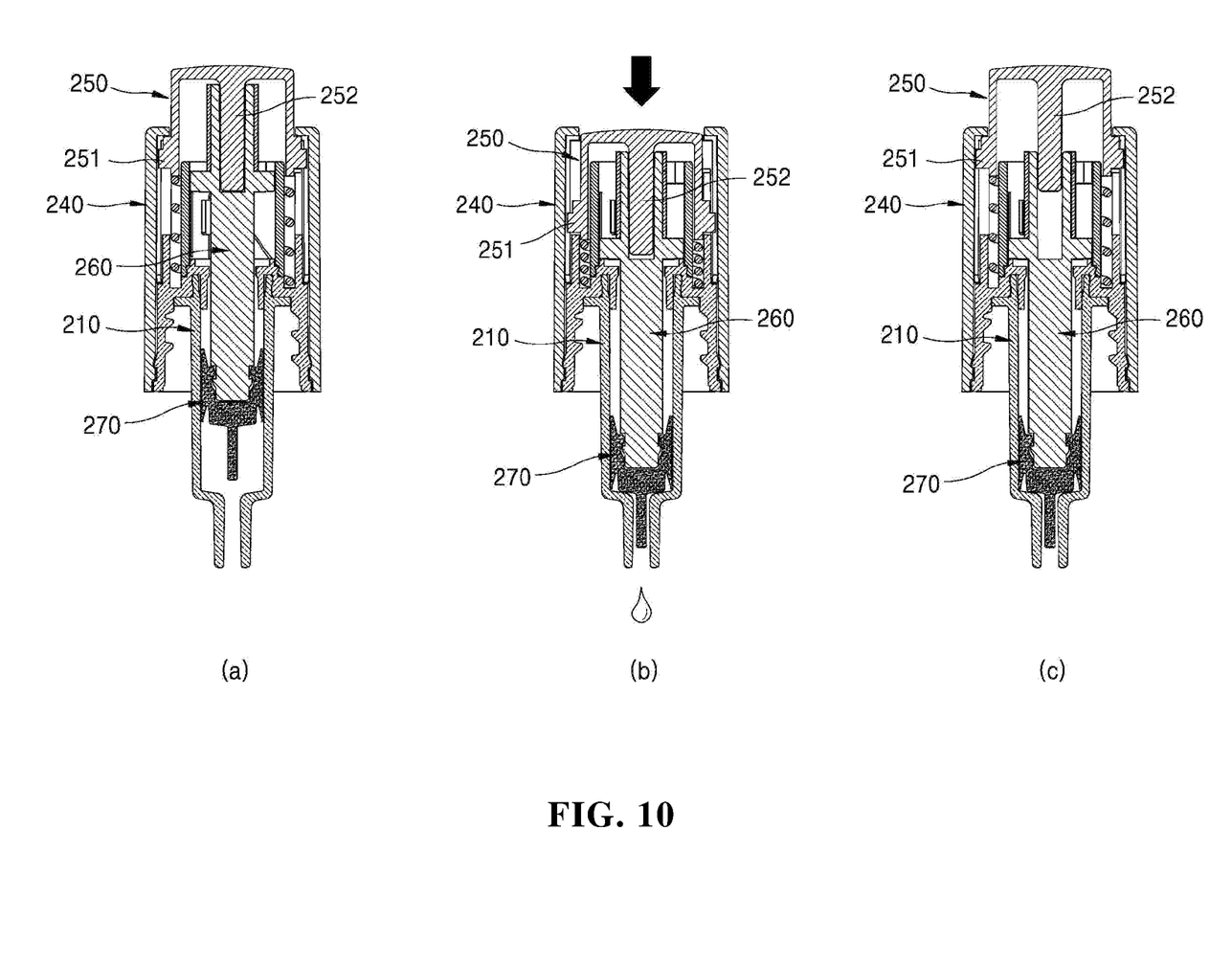
FIGS. 10 and 11 are views illustrating an exemplary operation of the fixed quantity discharge device for a liquid container according to one embodiment of the present invention.
Figure 11:
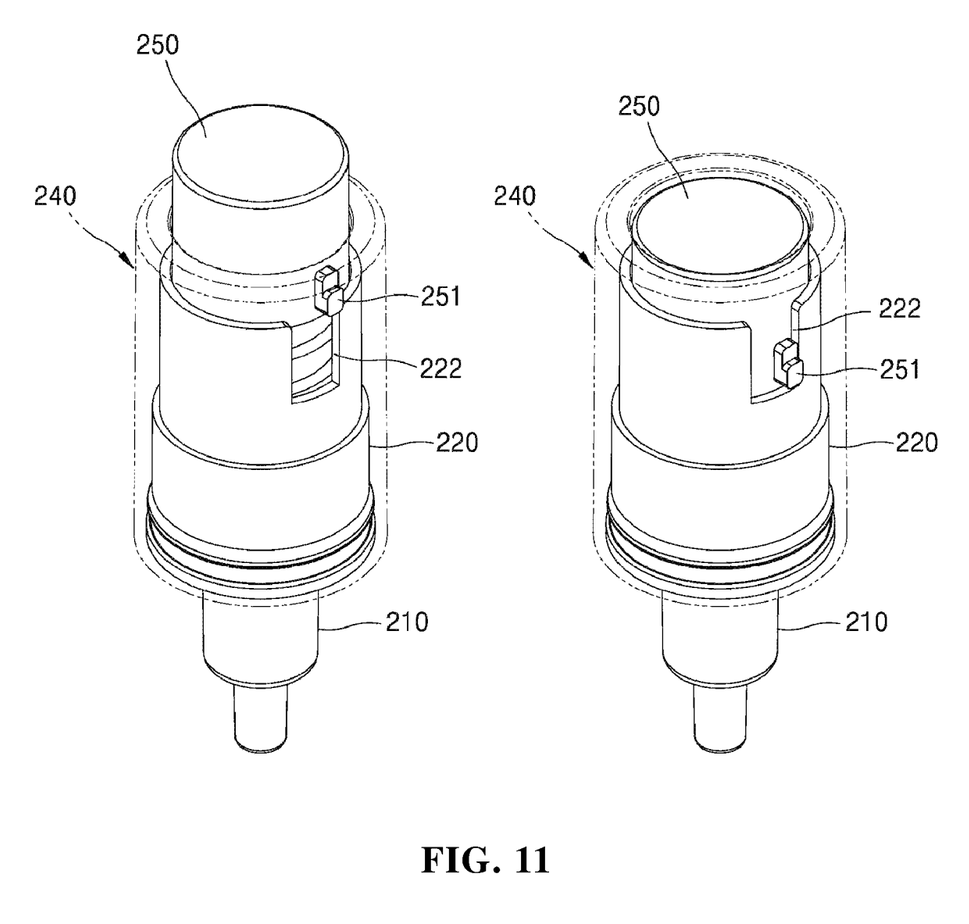

FIGS. 10 and 11 are views illustrating an exemplary operation of the fixed quantity discharge device for a liquid container according to one embodiment of the present invention. More specifically, FIGS. 10 and 11 are views illustrating an exemplary operation through which the contents are discharged to the outside in a state in which the pipette part is separated from the support.

Referring to FIGS. 10(a) and 11(a), the pipette part 200 is separated from the support 300 in a state in which the contents are suctioned in the pipette tube 210. In this case, the coupling protrusion 251 of the button part 250 is aligned with an upper side of the open part 222 of the screw cap 220, and the lifting protrusion 262 of the stem 260 is positioned in a separation space between the guide part 221 and the locking jaw 231 in a state in which the lifting protrusion 262 of the stem 260 is in contact with the locking jaw 231 (see FIG. 9(c)).

Next, referring to FIGS. 10(b) and 11(b), when the user presses the button part 250 in order to use the contents, the button part 250 is moved downward through the open part 222 of the screw cap 220 to move the stem 260 and the plunger tip 270 downward. Accordingly, the contents suctioned into the pipette tube 210 may be discharged to the outside through the open lower end portion of the pipette tube 210.

Next, referring to FIG. 10(c), in a case in which the user releases the pressure applied to the button part 250, the button part 250 is returned to an original position due to the elastic force of the elastic part 280. In this case, the plunger tip 270 and the stem 260 may not be moved upward and may maintain a state in which the plunger tip 270 and the stem 260 have been lowered due to a frictional force between the plunger tip 270 and the inner surface of the pipette tube 210.

Figure 12:
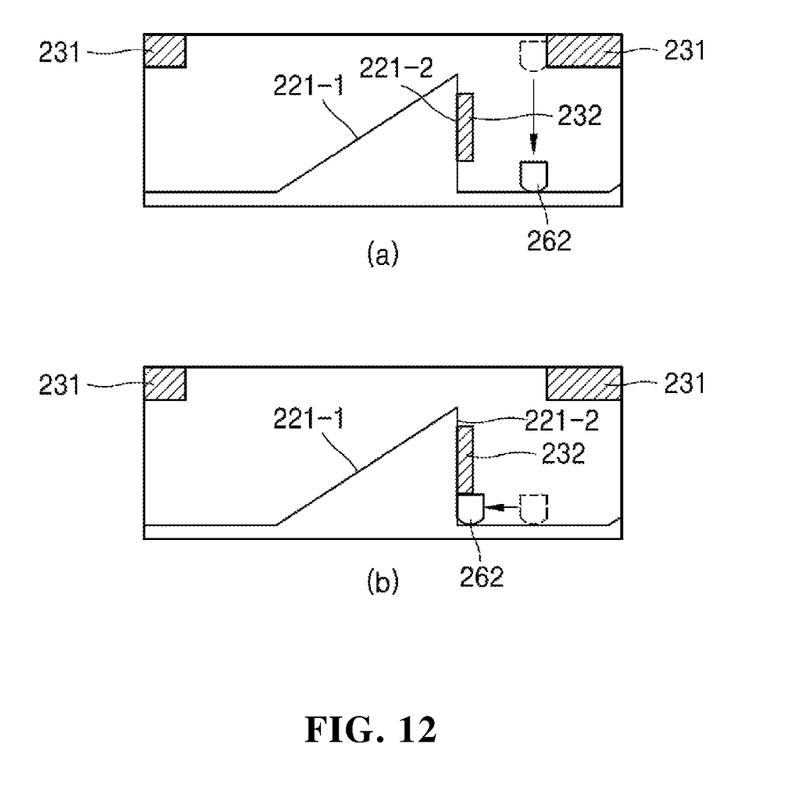
FIG. 12 is a set of views illustrating an exemplary operation of the fixed quantity discharge device for a liquid container according to one embodiment of the present invention.

FIG. 12 is a set of views illustrating an exemplary operation of the fixed quantity discharge device for a liquid container according to one embodiment of the present invention. More specifically, FIG. 12 shows views illustrating an exemplary movement of the lifting protrusion according to a coupling operation of the pipette part.

Referring to FIG. 12(a), when the contents are discharged from the pipette part 200 due to a pressure applied to the button part 250, the lifting protrusion 262 is moved downward to the inner lower end surface of the screw cap 220 through the separation space between the guide part 221 and the locking jaw 231.

Next, referring to FIG. 12(b), when the user inserts the pipette tube 210 of the pipette part 200 into the tube accommodation part 312 of the support 300 and rotates the outer cap 240 in the second direction opposite to the first direction, the stem 260 is rotated with the outer cap 240, and thus, the lifting protrusion 262 is moved in the second direction to come into contact with the vertical surface 221-2 of the guide part 221. When the outer cap 240 is continuously rotated in the second direction, a rotational force of the outer cap 240, the button part 250, and the stem 260 is transferred to the screw cap 220 through the vertical surface 221-2 so that the screw cap 220 is rotated with the outer cap 240 in the second direction and the pipette part 200 is coupled to the coupling part 311 of the support 300.

The exemplary embodiments have been disclosed with reference to the drawings and the specification as described above. Although the specific terms have been used in this specification, the terms are used to only describe the present invention and not to limit the meanings or the scope of the present invention defined by the claims. Therefore, it will be understood by those skilled in the art that various modifications and equivalent other example embodiments may be made. Therefore, the scope of the present invention is defined by the appended claims.

The invention claimed is:

1. A fixed quantity discharge device for a liquid container, comprising:
    a container main body in which contents are accommodated;
    a pipette part comprising:
        a pipette tube to suction and discharge the contents accommodated in the container main body;
        a stem inserted into the pipette tube and moved upward or downward;
        a plunger tip coupled to a lower end portion of the stem and vertically moved in the pipette tube according to upward or downward movement of the stem; and
        a screw cap screw-coupled to a coupling part and including a guide part formed inside an upper end portion thereof to guide upward movement of the stem to suction the contents accommodated in the container main body when the pipette part is separated therefrom; and
    a support disposed in an upper portion of the container main body and comprising:
        the coupling part formed in an upper end portion thereof to be coupled to the pipette part;
        a tube accommodation part extending from the coupling part to an interior of the container main body such that the pipette tube is inserted into or withdrawn from the tube accommodation part; and
        a contents inflow hole formed in a lower end portion thereof to communicate with the interior of the container main body,
    wherein, when the pipette part is separated from the support, the contents accommodated in the container main body are suctioned into the pipette tube.

2. The fixed quantity discharge device of claim 1, further comprising:
    an outer cap coupled to surround the screw cap, rotated according to manipulation of a user for separating or coupling the pipette part from or to the outer cap, and including a vertical guide groove formed in an inner surface thereof to guide vertical movement of a button part; and
    the button part coupled to an upper end portion of the stem and including at least one coupling protrusion formed on an outer surface thereof to be coupled to the vertical guide groove, wherein the button part and the stem are rotated with the outer cap in a same direction according to the rotation of the outer cap.

3. The fixed quantity discharge device of claim 2, wherein:
    the guide part includes an ascending guide surface formed to have an upper inclined surface in a first direction;
    at least one lifting protrusion is formed on an outer circumferential surface of the stem; and when the stem is rotated in the first direction due to the rotation of the outer cap, the lifting protrusion is moved along the ascending guide surface, and the stem is moved upward so that the contents accommodated in the container main body are suctioned into the pipette tube.

4. The fixed quantity discharge device of claim 3, further comprising an auxiliary cap coupled to the screw cap to surround the guide part, wherein a locking jaw which restricts movement of the lifting protrusion in the first direction is formed on an upper inner side of the auxiliary cap.

5. The fixed quantity discharge device of claim 4, wherein, when the lifting protrusion is moved to come into contact with the locking jaw according to the rotation of the stem in the first direction, the screw cap is rotated with the outer cap in the first direction so that the screw cap is separated from the coupling part of the support.

6. The fixed quantity discharge device of claim 4, wherein:

the locking jaw is formed to be spaced apart from the guide part; and when the lifting protrusion is positioned in a separation space between the guide part and the locking jaw and the user presses the button part, the stem and the plunger tip are moved downward so that the contents suctioned into the pipette tube are discharged to an outside.

7. The fixed quantity discharge device of claim 3, wherein:

the guide part further includes a vertical surface formed to face the ascending guide surface; and when the outer cap is rotated in a second direction opposite to the first direction through manipulation of the user and the lifting protrusion comes into contact with the vertical surface, the screw cap is rotated with the outer cap in the second direction so that the screw cap is coupled to the coupling part.

8. The fixed quantity discharge device of claim 2, wherein:

at least one open part is formed by cutting at least a part of a circumference of an upper portion of the screw cap downward; and when the coupling protrusion is aligned with the open part, the button part is moved downward due to a user's pressure.

9. The fixed quantity discharge device of claim 2, wherein:

a protrusion part protrudes downward from an upper inner side of the button with a predetermined length;

a coupling groove, which has a shape corresponding to the protrusion part such that the protrusion part is inserted into the coupling groove, is formed in the upper end portion of the stem; and an insertion depth of the protrusion part inserted into the coupling groove is changed in response to upward or downward movement of the stem.

\* \* \* \* \*